(12) United States Patent
Streubel et al.

(10) Patent No.: US 6,758,921 B1
(45) Date of Patent: Jul. 6, 2004

(54) METHOD OF MANUFACTURING A BENDING-RESISTANT, TORSIONALLY YIELDING TUBULAR PROFILED MEMBER AS A TRANSVERSE SUPPORT FOR A TWIST BEAM REAR AXLE OF A PASSENGER CAR

(75) Inventors: Wolfgang Streubel, Detmold (DE); Wigbert Christophliemke, Schloss Holte-Stuckenbrock (DE)

(73) Assignee: Benteler AG, Paderborn (DE)

( * ) Notice: Subject to any disclaimer, the term of this patent is extended or adjusted under 35 U.S.C. 154(b) by 0 days.

(21) Appl. No.: 09/651,431

(22) Filed: Aug. 30, 2000

(30) Foreign Application Priority Data

Sep. 2, 1999 (DE) .......................................... 199 41 993

(51) Int. Cl.[7] .............................. C21D 9/08; C21D 8/00
(52) U.S. Cl. ...................................... 148/593; 148/519
(58) Field of Search ................................ 148/516, 519, 148/559, 572, 593

(56) References Cited

U.S. PATENT DOCUMENTS

| | | | | |
|---|---|---|---|---|
| 3,656,219 A | * | 4/1972 | Connelly | |
| 3,769,103 A | * | 10/1973 | Wardwell et al. | |
| 3,795,551 A | * | 3/1974 | Swirnow | |
| 3,934,443 A | * | 1/1976 | Keen | |
| 4,477,708 A | * | 10/1984 | Sano et al. | 219/658 |
| 4,582,259 A | * | 4/1986 | Hoover et al. | 239/559 |
| 4,787,680 A | * | 11/1988 | Bonjean et al. | 301/124.1 |
| 6,487,886 B2 | * | 12/2002 | Ueno et al. | 72/57 |

FOREIGN PATENT DOCUMENTS

| | | | |
|---|---|---|---|
| EP | 0 306609 A2 | * | 3/1989 |
| EP | 0 752332 A1 | * | 1/1997 |

OTHER PUBLICATIONS

Davis et al (ed), Metals Handbook, 1990, ASM International, Tenth Edition, vol. 1, pp. 140, 141, 151, 162, 163, 240,241.*
Davis et al (ed), ASM Handbook, 1991, ASM International, vol. 4, pp. 371.*
Cotell et al (ed), ASM Handbook, 1991, ASM International, vol. 5, pp. 701, 708, 709, 948,949.*
Davis et al (ed), Metals Handbook, 1990, ASM International, Tenth Edition, vol. 1 pp. 147, 148, 206, 208, 389–391.*

* cited by examiner

*Primary Examiner*—Roy King
*Assistant Examiner*—Harry D Wilkins, III
(74) *Attorney, Agent, or Firm*—Henry M. Feiereisen

(57) ABSTRACT

In a method of manufacturing a bending-resistant, torsionally yielding tubular profiled member as a transverse support of a twist beam rear axle of a passenger car, a tube blank of tempering steel is cold formed to a tubular profiled member with a torsionally yielding central longitudinal section of a U-shaped cross-section and with opposed torsion-proof end sections. At least partial sections of the tubular profiled member are annealed at a temperature level between 850° C. and 960° C. The tubular profiled member is then hardened in water at a temperature above the AC3 point and subsequently tempered at a temperature between 200° C. and 550° C. for a duration of more than five minutes. As an alternative, a tube blank of case hardening steel is used, and at least partial sections of the tubular profiled member formed from this tube blank are case-hardened during a heat treatment with carburization of the surface of the tubular profiled member and subsequent quenching. The tubular profiled member in both variants is then subjected to at least one outer surface hardening process and finally subjected to further configuration processing steps for completing a twist beam rear axle.

11 Claims, 1 Drawing Sheet

METHOD OF MANUFACTURING A BENDING-RESISTANT, TORSIONALLY YIELDING TUBULAR PROFILED MEMBER AS A TRANSVERSE SUPPORT FOR A TWIST BEAM REAR AXLE OF A PASSENGER CAR

BACKGROUND OF THE INVENTION

1. Field of the Invention

The invention relates to a method of manufacturing a bending-resistant, torsionally yielding tubular profiled member as a transverse support for a twist beam rear axle of a passenger car.

2. Description of the Related Art

Various suggestions are known in regard to designs of transverse supports of a twist beam rear axle of a passenger car in order to provide them, on the one hand, with bending resistance and, on the other hand, with a sufficient torsional yield. Prior art references concerned with these problems are, for example, EP 0 249 537 B1, EP 0 681 932 A2, EP 0 752 332 B1, DE-Gm 297 20 207, and U.S. Pat. No. 2,069,911.

All of these transverse supports have in common that their manufacture overall is complex, and, accordingly, the production costs within the context of a complete twist beam rear axle are high.

SUMMARY OF THE INVENTION

It is an object of the present invention to provide a method of manufacturing a bending-resistant, torsional yielding tubular profiled member as a transverse support for a twist beam rear axle for a passenger car which not only ensures an increased economical production but also, with respect to the respectively required conditions, makes it possible to design the individual process parameters variable as much as possible.

In accordance with the present invention, this is achieved according to a first variant of the method in that a tubular blank of tempering steel is first provided by U-shaped cold forming with a torsionally yielding central longitudinal section while ensuring torsion-proof end sections, whereupon the thus formed tubular profiled member is annealed at least in partial sections thereof at a temperature level between 850° C. and 960° C., is subsequently hardened in water at a temperature above the AC3 point, is subsequently tempered at a temperature between 200° C. and 550° C. for a duration of more than 5 minutes, is subsequently subjected to at least an outer surface hardening, and is finally subjected to further configuration processing steps for completing a twist beam rear axle.

Accordingly, a tube blank, independent of its cross-section, of tempering steel is being used for the manufacture of a tubular profiled member as a transverse support for a twist beam rear axle. First, the tube blank is provided by means of U-shaped cold forming with a central longitudinal section that is torsionally yielding while ensuring at the same time torsion-proof end section. The configuration of the end sections can be as desired. It can be circular or shoe-shaped, optionally with incorporation of stay-shaped sheet metal. Also, reinforcement embossments can be provided in the transitional sections between the U-shaped central longitudinal section and the end sections.

After cold forming, the now present tubular profiled member is subjected to a heat treatment in which, at least in partial sections thereof, it is annealed at a temperature level between 850° C. and 960° C. In this context, the term partial sections refers preferably to the end sections of the tubular profiled member. Subsequently, the tubular profiled member is hardened in water at a temperature above the AC3 point of the iron-carbon-diagram and is subsequently tempered at a temperature between 200° C. and 550° C. for a duration of more than 5 minutes.

A tubular profiled member formed and heat-treated such exhibits then a high permanent strength under dynamic load, as is desirable especially in regard to the aforementioned torsional profiled member as a component of the twist beam rear axle of a passenger vehicle.

Subsequent to the heat treatment, the tubular profiled member is subjected to at least an outer surface hardening. This refers primarily to a mechanical surface hardening. Optionally, it is also possible to perform an additional inner surface hardening, especially by mechanical means.

Finally, the thus manufactured tubular profiled member is subjected to further configuration processing steps for completion of a twist beam rear axle.

An especially advantageous embodiment of the afore described variant is provided when the tubular profiled member is annealed at a temperature level between 920° C. and 950° C., especially approximately 930° C.

In this context it is especially important when the annealed tubular profile is then tempered at a temperature of approximately 280° C. for a duration of approximately 20 minutes.

In the context of the invention it is also advantageous when a tube blank of the material specification 22MnB5 is used for the manufacture of the tubular profiled member as a transverse support of a twist beam rear axle.

In accordance with the present invention, the object of the invention is moreover achieved according to a second variant of the method in that a tubular blank of case-hardening steel is first provided by U-shaped cold forming with a torsionally yielding central longitudinal section while ensuring torsion-proof end sections, whereupon the thus formed tubular profiled member is subjected to case hardening at least in partial sections thereof during the course of a heat treatment by carburization of the surface layer of the tubular profiled member with subsequent quenching, is subsequently subjected to at least an outer surface hardening process, and is finally subjected to further configuration processing steps for completion of a twist beam rear axle.

In the context of this variant a case-hardening steel is used. In this variant, a tube blank of a case-hardening steel is also first provided by U-shaped cold forming with a torsionally yielding central longitudinal section. The end sections of the tubular profiled member are, however, torsion-proof. As in the first variant, the end sections can be of different configurations.

Subsequent to the cold forming step, the thus formed tubular profiled member is case-hardened at least in partial sections thereof during the course of a heat treatment by carburization of the surface layer of the tubular profiled member with subsequent quenching. According to the invention, this also ensures that a cold-formed tubular profiled member as a transverse support in the context of a finished twist beam rear axle is provided with a high permanent strength under dynamic load.

After the heat treatment process an outer surface hardening is carried out. Subsequently, the tubular profiled member is subjected to further configuration processing steps for completion of a twist beam rear axle.

A preferred steel specification (quality) for forming a bending-resistant, torsionally yielding tubular profiled member is C15.

For the first as well as for the second variant of the method according to the invention, it is very advantageous when the heat treatment of the cold-formed tubular profiled member is performed in the transition sections between the U-shape central longitudinal section and the torsion-proof end portions.

Moreover, it is advantageous when the surface hardening of the profiled member is carried out by bombarding with balls, especially steel balls.

DESCRIPTION OF THE PREFERRED EMBODIMENTS

Figure 1:
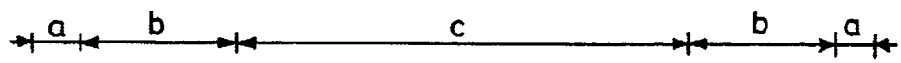
FIG. 1 is a plan view of a tubular profiled member as a transverse support for a twist beam rear axle of a passenger car.
Figure 2:
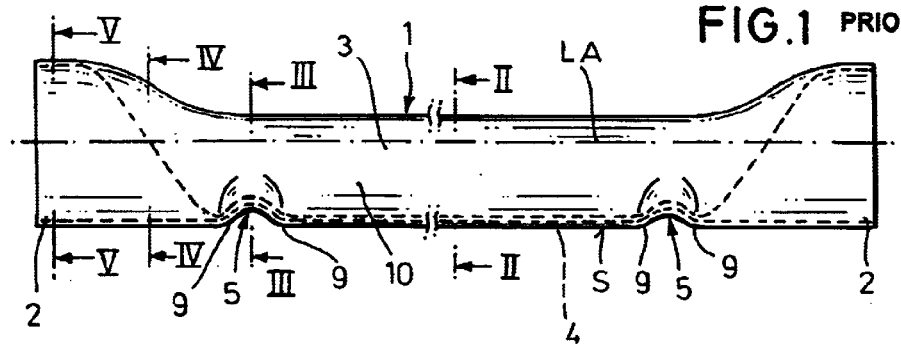
FIG. 2 is a cross-section of the tubular profiled member according to FIG. 1 along the section line II—II.
Figure 2:
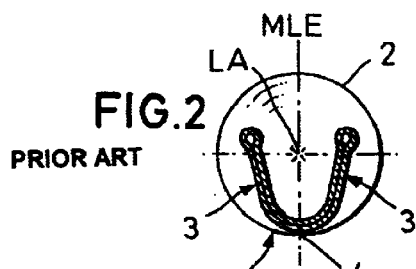
Figure 5:
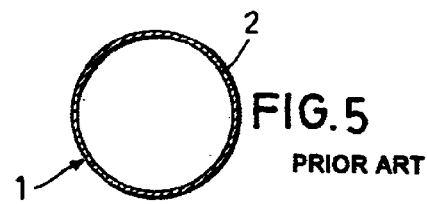
FIG. 5 is a cross-section of the tubular profiled member according to FIG. 1 along the section line V—V.

In FIG. 1 a tubular profiled member 1 as a transverse support for a twist beam rear axle (known in the art and therefore not explained in more detail in this context) of a passenger car is illustrated. The tubular profiled member 1 is manufactured of an originally round tube blank (FIG. 5) which is comprised of a tempering steel of the steel specification 22MnB5.

The non-cutting cold forming step maintains the cross-section of the tubular profiled member 1 in the end sections. This circular cross-section of the ends 2 of the end sections a of the tubular profiled member 1 has, however, a continuous transition via the transition sections b into a U-shaped double-wall cross-section which extends across the central longitudinal section c of the tubular profiled member 1 (FIGS. 1 through 5).

Assuming that the tubular profiled member 1 according to FIG. 1 is illustrated in a plan view, i.e., in the mounted position within the passenger car, the legs 3 of the central U-shaped longitudinal section c (FIGS. 2 and 3) extend from an arc-shaped stay 4 in the direction of travel FR with slight divergence relative to the horizontal central longitudinal plane MLE of the tubular profiled member 1 extending through the longitudinal axis LA.

Figure 3:
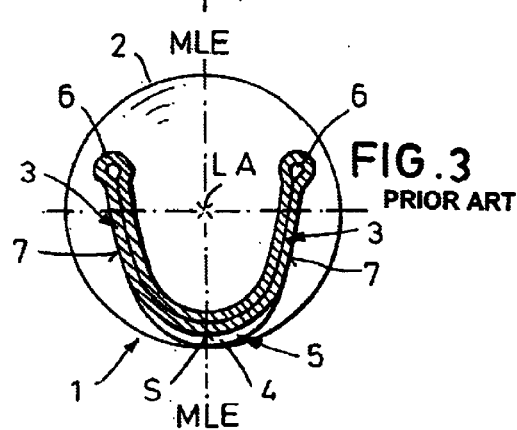
FIG. 3 is a cross-section of the tubular profiled member according to FIG. 1 along the section line III—III.
Figure 4:
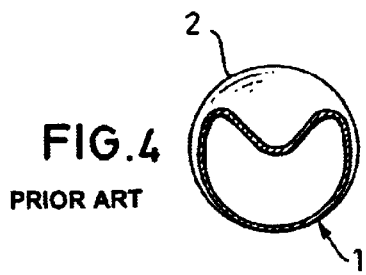
FIG. 4 is a cross-section of the tubular profiled member according to FIG. 1 along the section line IV—IV.

The tubular profiled member 1 is provided with groove-like embossments 5 at the ends of the central U-shaped longitudinal section c. These embossments 5 extend in a direction transverse to the tubular profiled member 1. FIG. 3 shows that the embossments 5 have the greatest depth at the apex S of the U-shaped longitudinal section c located in the horizontal central longitudinal plane MLE. The depth of the embossments decreases in the direction toward the free ends 6 of the legs 3 until they uniformly adjoin the outer surface 7 of the legs 3. Viewed in longitudinal section, the embossments 5 thus have a sickle-shaped configuration.

The edges of the embossments 5 are rounded.

After cold forming of a circular tube blank of tempering steel of the steel specification (quality) 22MnB5 the now present tubular profiled member 1 according to FIGS. 1 through 5 is annealed in the transition sections b at a temperature level of approximately 930° C. Subsequently, the tubular profiled member 1 is hardened in water at a temperature above the AC3 point and is subsequently tempered at a temperature of approximately 280° C. for a duration of 20 minutes. Then the tubular profiled member 1 is bombarded with steel balls on its outer surface 10 and is subsequently subjected to further configuration processing steps for completion of a twist beam rear axle.

While specific embodiments of the invention have been shown and described in detail to illustrate the inventive principles, it will be understood that the invention may be embodied otherwise without departing from such principles.

What is claimed is:

1. A method of manufacturing a bending-resistant, torsionally yielding tubular profiled member as a transverse support of a twist beam rear axle of a passenger car, the method comprising the steps of:

cold-forming a tube blank of tempering steel to a tubular profiled member with a torsionally yielding central longitudinal section of a U-shaped cross-section and with opposed torsion-proof end sections;

annealing transitional sections of the tubular profiled member located between the torsionally yielding central longitudinal section and the opposed torsion-proof end sections at a temperature level between 850° C. and 960° C.;

hardening the tubular profiled member in water at a temperature above the AC3point;

tempering the tubular profiled member at a temperature between 200° C. and 550° C. for a duration of more than five minutes;

subjecting the tubular profiled member at least to an outer surface hardening process; and subjecting the tubular profiled member to further configuration processing steps for completing a twist beam rear axle.

2. The method according to claim 1, wherein the step of annealing is carried out at a temperature level of approximately 930° C.

3. The method according to claim 1, wherein the outer surface hardening is carried out by bombardment with balls.

4. The method according to claim 1, wherein the surface hardening is carried out by bombardment with steel balls.

5. The method according to claim 1, wherein the step of annealing is carried out at a temperature level between 902° C. and 950° C.

6. The method according to claim 1, wherein the step of tempering is carried out at a temperature of approximately 280° C. for a duration of approximately 20 minutes.

7. The method according to claim 1, wherein the tempering steel of the tube blank is of the specification 22MnB5.

8. A method of manufacturing a bending-resistant, torsionally yielding tubular profiled member as a transverse support of a twist beam rear axle of a passenger car, the method comprising the steps of:

cold-forming a tube blank of case hardening steel to a tubular profiled member with a torsionally yielding central longitudinal section of a U-shaped cross-section and opposed torsion-proof end sections;

case-hardening transitional sections of the tubular profiled member located between the torsionally yielding central longitudinal section and the opposed torsion-proof end sections during a heat treatment with carburization of the surface of the tubular profiled member and subsequent quenching;

subjecting the tubular profiled member at least to an outer surface hardening process; and subjecting the tubular profiled member to further configuration processing steps for completing a twist beam rear axle.

9. The method according to claim 8, wherein the surface hardening is carried out by bombardment with balls.

10. The method according to claim 9, wherein the surface hardening is carried out by bombardment with steel balls.

11. The method according to claim 8, wherein the case-hardening steel of the tube blank is of the specification C15.

* * * * *